July 5, 1960

C. K. STROBEL ET AL 2,943,488

HUMIDISTAT

Filed May 27, 1957

C. K. STROBEL ET AL 2,943,488

HUMIDISTAT

Filed May 27, 1957

INVENTORS.
CHARLES K. STROBEL, ROBERT G. M<sup>c</sup>MICHAEL
AND RICHARD T. KIMMELL.
BY
THEIR ATTORNEY.

United States Patent Office 2,943,488
Patented July 5, 1960

2,943,488
HUMIDISTAT

Charles K. Strobel, Pittsburgh, Robert G. McMichael, Irwin, and Richard T. Kimmell, Hunker, Pa., assignors to Robertshaw-Fulton Controls Company, Richmond, Va., a corporation of Delaware Filed May 27, 1957, Ser. No. 661,923

4 Claims. (Cl. 73—336.5)

This invention relates to humidistats and more particularly to such humidistats having a capacitance forming part of the sensing system.

It is a principal object of this invention to determine the relative humidity of an environment.

Another object of this invention is to employ a capacitance of novel construction as the sensing element in controlling the relative humidity of an environment.

Another object of this invention is to employ a capacitance of novel construction as the sensing element in combination with a capacitance sensitive relay in controlling the relative humidity of an environment.

With these and other objects in view, the invention may take the form of a capacitance having novel construction in combination with an oscillator circuit. The oscillator circuit includes an oscillatory tank circuit coupled to an electron discharge tube with a source of alternating voltage for the anode of the oscillator tube. A work circuit which is operatively associated with a humidity changing means may be connected in the anode circuit of the electron tube and an additional circuit arranged to apply a positive bias to the grid of the electron tube during the positive half cycles of the power supply to the anode. With this arrangement, the amplitude of the alternating current generated by the oscillator will increase from a minimum to a maximum value substantially instantaneously with the initiation of oscillation.

Other objects and advantages will become apparent from the following specification taken in connection with the accompanying drawings.

Referring to the drawings.

Figure 1:
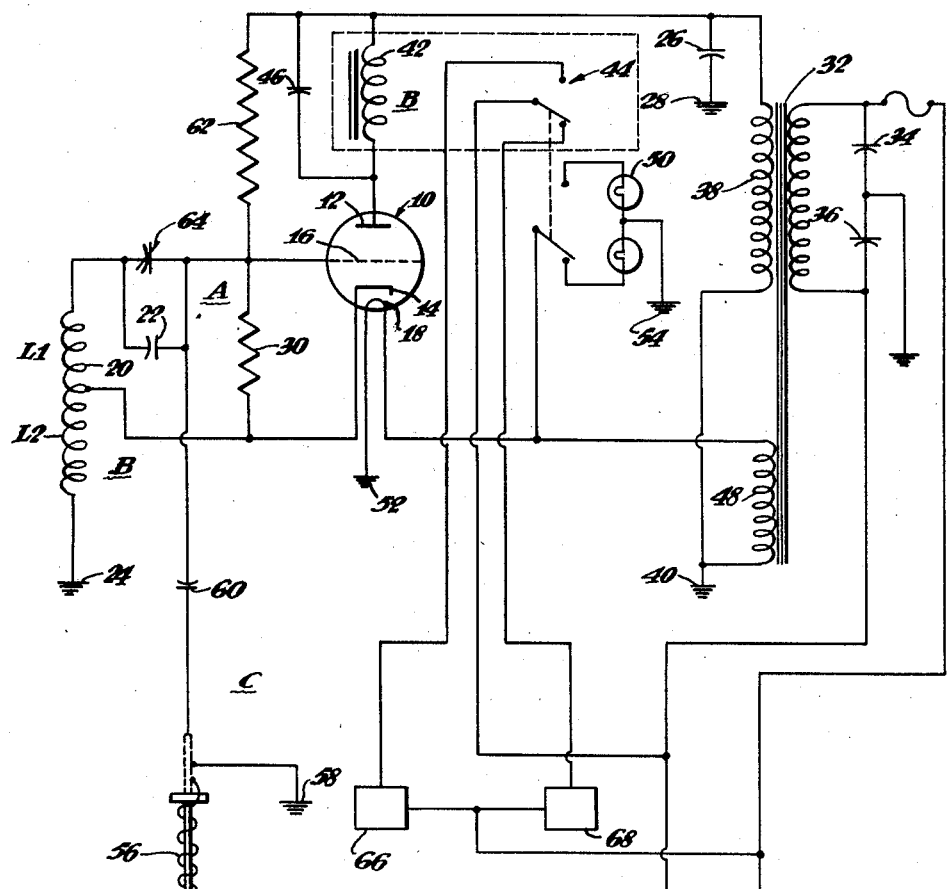
Figure 1 is a diagrammatic showing of the essential elements of a capacitance in combination with a capacitance sensitive relay.

Referring more particularly to the drawings, the system embodying this invention is shown as comprising an oscillator A controlling the operation of a relay B, and a capacitance C arranged to apply a positive bias to the grid.

The oscillator A comprises an electron discharge tube 10 having an anode 12, cathode 14, grid 16 and cathode heater 18. Coupled to the electron discharge tube 10 is an oscillatory circuit consisting of a coil 20 connected in parallel with a capacitance 22, one end of the coil 20 being grounded at 24. The cathode 14 of the tube 10 is connected to a center tap in the coil 20. Condenser 26 is a blocking condenser grounded at 28. The cathode is maintained at an alternating current potential above ground. A grid leak is provided and takes the form of a resistor 30 connected between the grid 16 and the cathode 14.

Power is supplied to the system by a transformer 32 the primary winding of which is connected across a source of alternating current supply. The input lines are connected by two condensers 34 and 36 in series and have a common terminal to ground. A secondary winding 38 of the transformer 32 has one terminal thereof connected to ground 40 and the other terminal thereof connected to the anode 12 through a coil 42 of relay 44. A suitable condenser 46 is connected in parallel with the coil 42. Another secondary coil 48 of power transformer 32 provides voltage for the heating element 18 and is grounded at 40 while the heating element is connected to ground 52. Relay 44 also switches signal lights 50 which are energized by the voltage delivered by secondary winding 48. The signal lights are grounded at 54.

The oscillations are controlled by a capacitative potentiometer which comprises a condenser 56, one plate of which is connected to ground 58, and condenser 60 which provides additional capacitance. Condenser 56 is a condenser whose capacitance changes due to a change in its dielectric material caused by changes in humidity. Condenser 56 will be described in greater detail below. Condensers 56 and 60 are connected in series with variable condenser 64. Grid 16 of the tube 10 is connected to the junction between condensers 64 and 60. Condenser 56 is in effect connected to one end of the tank circuit at ground, while the variable condenser 64 is connected to the other end. In this arrangement, the input circuit of the electron discharge tube 10 is connected as the detector branch of an electrical bridge of which condensers 64, 60 plus 56 and coils 20 form the legs and the balanced diagonal is connected at one end to the grid 16 and at the other end to the cathode 14.

With the oscillator thus far described, oscillations will be sustained when the grid 16 is energized by a component of alternating voltage opposite in phase to the alternating voltage appearing at the anode 12. If the impedance ratio between the two halves of the coil 20, i.e., L1 and L2, is greater than the impedance ratio between the condensers 64, 60 plus 56, the grid 16 will be supplied with alternating potential of the proper phase to initiate and sustain oscillations. However, if the capacitance of the condenser 56 is increased or its impedance decreased, the amplitude of the alternating potential applied to the grid 16 will be decreased and the amplitude of the oscillations will be decreased.

A gradual change of the capacitance of the condenser 56 will change the amplitude of oscillation from zero to some maximum value which depends upon the characteristics of the tube 10. Such change of capacitance in the condenser 56 will drive the grid 16 positive with respect to the cathode 14 resulting in a grid current flow and establishing a direct current bias across the grid leak 30. This bias will reach a level which will limit the amplification of the tube 10 so that a stable operating point will be reached.

Under conditions of zero oscillation, no bias is developed and the tube 10 will pass maximum plate current. However, under conditions of maximum oscillation maximum bias is developed and the tube 10 passes minimum plate current. It will thus be apparent that in gradually increasing the feedback from zero to a maximum, the plate current is progressively reduced from a maximum value to a minimum value.

In operation of the device thus far described, assuming that the transformer 32 is connected across a 60 cycle A.C. power supply, the capacitance of condenser 56 is substantially smaller than that of variable condenser 64, and the tube 10 will oscillate during positive half cycles reaching maximum amplitude at the peak positive half-wave of the source. This amplitude of oscillation being controlled by the gain of the tube and the self bias generated by the self-rectification of the grid and developed across the grid leak 30 is reduced when the capacitance of condenser 56 is increased since the amount of feedback is reduced due to the decrease in the impedance ratio between the condenser 64 and the condensers 56 and 60. As the capacitance in condenser 56 is reduced further, the feedback is further reduced until there is insufficient feedback of the proper phase to sustain oscillation. An appreciable change in the value of condenser 56 is required to change from zero to maximum amplitude of oscillation and this change is progressive. In addition to a progressive change in the amplitude of oscillation, the plate current changes from minimum to maximum, and at the point of maximum or near maximum current, the relay B is able to operate.

It is a well-known characteristic of electrical relays that a larger current is required to move the armature to attracted position than is necessary to hold the armature in such position. Thus, if a capacitance sensitive relay is to operate between its "pull in" and "drop out" positions in response to small changes in the capacitance of the condenser 56, the variation in plate current must be relatively large as compared with the variations in the capacitance of condenser 56. It is desirable that around the operating point there be a snap action transition in tube 10 when the circuit changes from an oscillating to a non-oscillating state and vice versa. Such a snap action transition eliminates for all practical purposes the progressive extent of the capacitance in condenser 56, thus making the oscillator circuit highly sensitive around the operating point. To accomplish this, means is provided for applying a positive bias to the grid 16 during the positive half-cycles of the power supply to the tube 10. Therefore, the secondary winding 38 of the transformer 32 is connected to the grid 16 through a resistance 62. With such an arrangement, reduction of the capacitance of the condenser 56 to produce an alternating potential of the correct phase to initiate and sustain oscillation will result in a substantially instantaneous increase in the amplitude of oscillation from a minimum to a maximum causing an instantaneous change in plate current of such a magnitude as to operate the relay 44 which also operates signal lights 50. Similarly, as the capacitance of the condenser 56 is reduced below the value wherein the alternating potential fed to the grid 16 is of such phase as to terminate oscillation, an instantaneous reduction in plate current results.

The total effect of including an additional grid potential in phase with the plate voltage is to enable the tube 10 to become more conductive to current than would be the case without the addition of this potential, thereby allowing an instantaneous change of state from oscillating to non-oscillating or vice versa for small changes of grid potential induced from the tank circuit. From this it can be seen that for small changes of capacitance in condenser 56 at the critical point, the change in feedback is capable of snapping the tube into an oscillating or non-oscillating condition whereby maximum or minimum current in the plate circuit is attained substantially instantaneously without the intermediate stages of increasing or decreasing the current to these points.

It will be appreciated that the relay 44 in the plate circuit responds to the oscillating and non-oscillating conditions to operate either load 66 or load 68, while at the same time operating signals 50.

Figure 3:
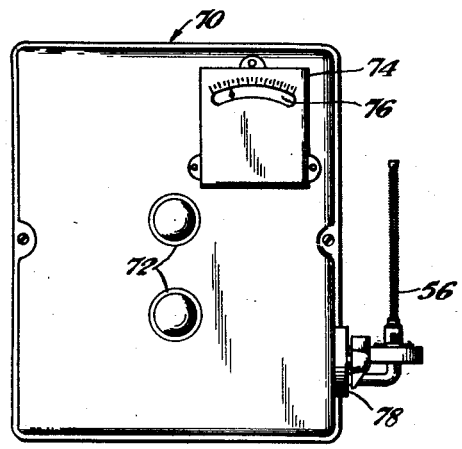
Figure 3 is a front elevation of the housing with the capacitance mounted at a side.
Figure 2:
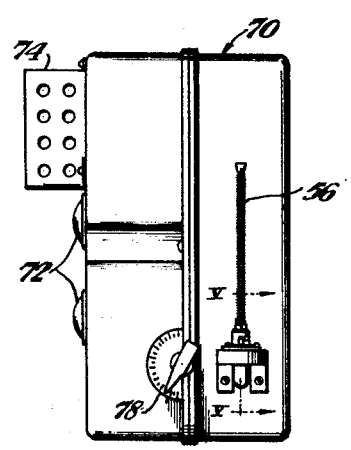
Figure 2 is a side elevation of the capacitance mounted to a housing containing the oscillatory circuit.

Now referring to Figures 2 and 3, the capacitance sensitive relay is mounted in case 70. It will be appreciated that any suitable housing of a conventional nature may be employed. The case has openings 72 at the front for viewing the signal lights. On the outside of the case is mounted an independent humidity indicator 74 with dial 76. The sensing element condenser 56 is mounted at the side of the casing. A calibrated switch 78 is mounted at the side. This switch is suitably linked to variable condenser 64 in order to change its capacitance, thereby changing the point of relay operation.

Figure 4:
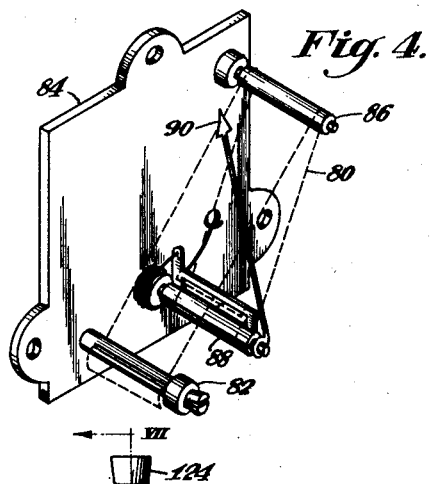
Figure 4 is a view of an independent humidity indicator.

Now referring to Figure 4, the unit portrayed by the dotted lines refers to a humidity sensitive element 80 and takes the form of a ribbon. The ribbon may be any material which changes its length relative to the humidity of the environment. For purposes of the device herein employed a ribbon made of nylon makes a satisfactory ribbon. One end of the ribbon is secured to a rod 82 which extends perpendicularly from back plate 84. The ribbon passes around a journalled member 86. The other end of the ribbon is secured to another journalled member 88 which is spring biased to retain the ribbon in a suitable taut condition. Pointer 90 is mounted on one end of journalled member 88 and is adapted to describe an arc as the journalled member revolves. Pointer 90 sweeps past a calibrated dial 76, shown in Figure 2. The described humidity indicator is calibrated to indicate the relative humidity of the environment and the information imparted therefrom is used in adjusting the operation of the humidistat of this invention.

Figure 5:
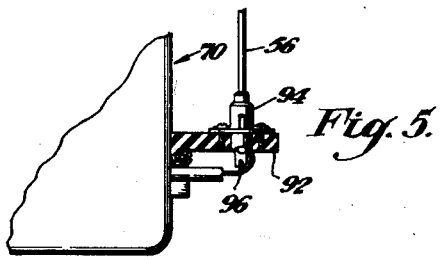
Figure 5 is a cross section taken along line V—V of Figure 2.

Figure 5 illustrates the means for mounting condenser 56 to the side of the casing 70. An L-shaped bracket 92 is secured to the side of the casing in a conventional manner. The condenser 56 is mounted on the bracket by means of a coaxial plug-type connection 94. Leads 96 from the coaxial plug enter the side of the casing 70.

Figure 6:
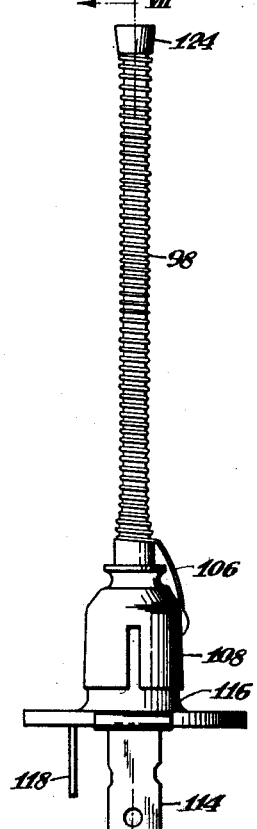
Figure 6 is an enlarged view of the capacitance sensing element.
Figure 8:
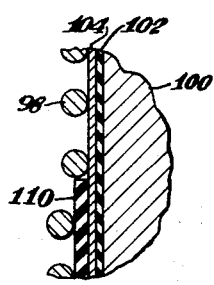
Figure 8 is an enlarged view of a portion of the cross section illustrated by Figure 7.
Figure 7:
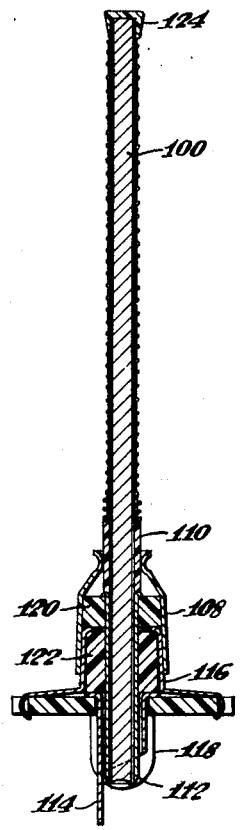
Figure 7 is a cross section taken along line VII—VII of Figure 6.

Now referring to Figures 6, 7 and 8 which illustrate in detail the condenser 56 and means for mounting same. Condenser 56 has the same features as all condensers, namely, two oppositely disposed plates at varying potential separated by a dielectric material. The condenser 56 of this invention employs a wire wound into a helix 98 as one plate of the condenser. The oppositely disposed plate is a metal core 100 within the helically wound wire 98. The wire as well as the metal core are insulated by humidity insensitive material in a conventional manner. Reference numeral 102 in Figure 8 illustrates the insulation on the metal core 100. The core and the wire are separated by humidity sensitive dielectric material 104, which may be cotton, nylon or other suitable materials.

The helix 98 has a lead 106 secured to the outer shell conductor 108 of the coaxial plug. The outer shell is separated from the core by an insulating bushing 110. When assembled, the metal core is in electrical contact with inner pin conductor 112 which in turn is in contact with inner conductor 114. One of the leads is secured to the inner conductor. The outer shell conductor is slidably mounted over outer conductor 116 which ends in a conventional terminal 118 for the second lead wire. The inner pin conductor 112 is insulated from the outer shell conductor 108 by washer 120, and is further insulated from the outer conductor 116 by insulating core 122. The upper end of the helix is suitably secured by means of a binder 124 which may take the form of sealing wax.

A novel feature of the condenser 56 is the use of a helix for one plate of the condenser rather than using, say, a tube suitably placed over the core. The use of a helix permits the dielectric 104 to be in contact with the environment so that its dielectric qualities will change as the humidity changes. It will be appreciated that the plate surrounding the core may take a number of forms. The helix, for instance, may be composed of a metal ribbon. The outer plate may be a tube that has been perforated so that the dielectric will be in contact with the surrounding air.

The metal core 100 may take a variety of forms. The core may be a metal tube or may be composed of a plurality of flat metallic strips. It is seen, therefore, that the condenser does not necessarily have to be rod-like in shape but may take a variety of forms. It is within the purview of this invention to employ a condenser comprising two flat parallel perforated metal plates with a humidity sensitive dielectric between.

The novel humidity sensing element may be employed with capacitance sensitive circuits, other than the one herein described. It may be employed in combination with conventional recorders and controllers of many types.

The humidity sensing element of the invention has good sensitivity over the range of from about zero percent to 100 percent relative humidity. In addition, the usual room temperature variations do not seriously affect the performance of the sensing element.

In the operation of the humidistat the frequency of oscillation is high relative to the A.C. supply frequency. Very good results have been obtained with a frequency of oscillation in the low radio frequency range. By applying a positive bias to the grid of the oscillator tube 10 during the positive half-cycles of the power supply, variations in the characteristics of the circuits resulting from variations in the power supply are minimized.

It will be apparent to those skilled in the art that many modifications of the disclosed embodiment of this invention may be made without departing from the scope thereof which is to be measured by the appended claims.

We claim:

1. A humidistat comprising a casing, a capacitance sensitive relay disposed within said casing, a humidity sensitive condenser comprising an inner metallic core as one plate having a central axis, an outer metallic helix as the other plate disposed with its longitudinal axis substantially coincident with the central axis of said inner core, a humidity sensitive dielectric disposed between said plates and being responsive to changes in humidity for varying the capacitance between said plates, an outer shell connected to said helical plate, said inner plate extending through said shell and forming a plug portion at one end thereof, mounting means connected to said casing for removably mounting said condenser thereon, said mounting means being adapted to receive said outer shell and said plug portion of said inner core, and means for electrically connecting said condenser to said relay means for actuation thereof in response to capacitance changes.

2. A humidity sensitive condenser for use with a humidistat having connecting means associated therewith, comprising an elongated inner conducting member forming one plate having a longitudinal axis, a conducting helix forming the other plate and disposed concentrically about the longitudinal axis of said inner conducting member, said helix being of shorter length than said elongated member whereby said elongated member extends beyond said helix, a conducting shell connected to said helix and being disposed concentric with the portion of said elongated member which extends beyond said helix, said conducting shell and the portion of the elongated member concentric therewith being adapted to be received by said connecting means.

3. A humidity sensitive condenser for a humidistat having mounting means formed therewith comprising an elongated metallic rod forming a first plate, a metallic helix forming a second plate and being disposed concentrically about the longitudinal axis of said first plate and having a length less than that of said first plate, one end of said rod being disposed in substantially the same plane as one end of said helix whereby the other end of said rod extends beyond the other end of said helix, a substantially tubular shell member disposed concentric with said other end of said rod and being electrically connected to said outer helix, and an insulator disposed between said shell and said rod to prevent a flow of current therebetween, said shell and a portion of said rod coaxial therewith being adapted to be received by said connecting means.

4. A humidity sensitive condenser for use with a humidistat having connecting means associated therewith, comprising an elongated cylindrical inner conducting member forming one plate, a second conducting member forming the other plate and being helically wound to encircle substantially the length of said inner conducting member, a humidity sensitive dielectric disposed between said plates and being responsive to changes in humidity for varying the capacitance between the plates, and a conducting shell connected to said second member and being disposed coaxial with a portion of said inner conducting member, said conducting shell and the portion of the elongated member coaxial therewith being adapted to be received by said connecting means.

References Cited in the file of this patent

UNITED STATES PATENTS

| | | |
|---|---|---|
| 1,506,764 | May | Sept. 2, 1924 |
| 1,715,319 | Houck | May 28, 1929 |
| 1,708,074 | Allen | Apr. 9, 1929 |
| 1,765,816 | Allen | June 24, 1930 |
| 2,283,927 | Howe | May 26, 1942 |
| 2,412,782 | Palmer | Dec. 17, 1946 |
| 2,801,339 | Hubbard | July 30, 1957 |
| 2,807,956 | Doble | Oct. 1, 1957 |